April 1, 1930.    F. A. WALKER    1,752,823
SPRAY NOZZLE
Filed May 18, 1927
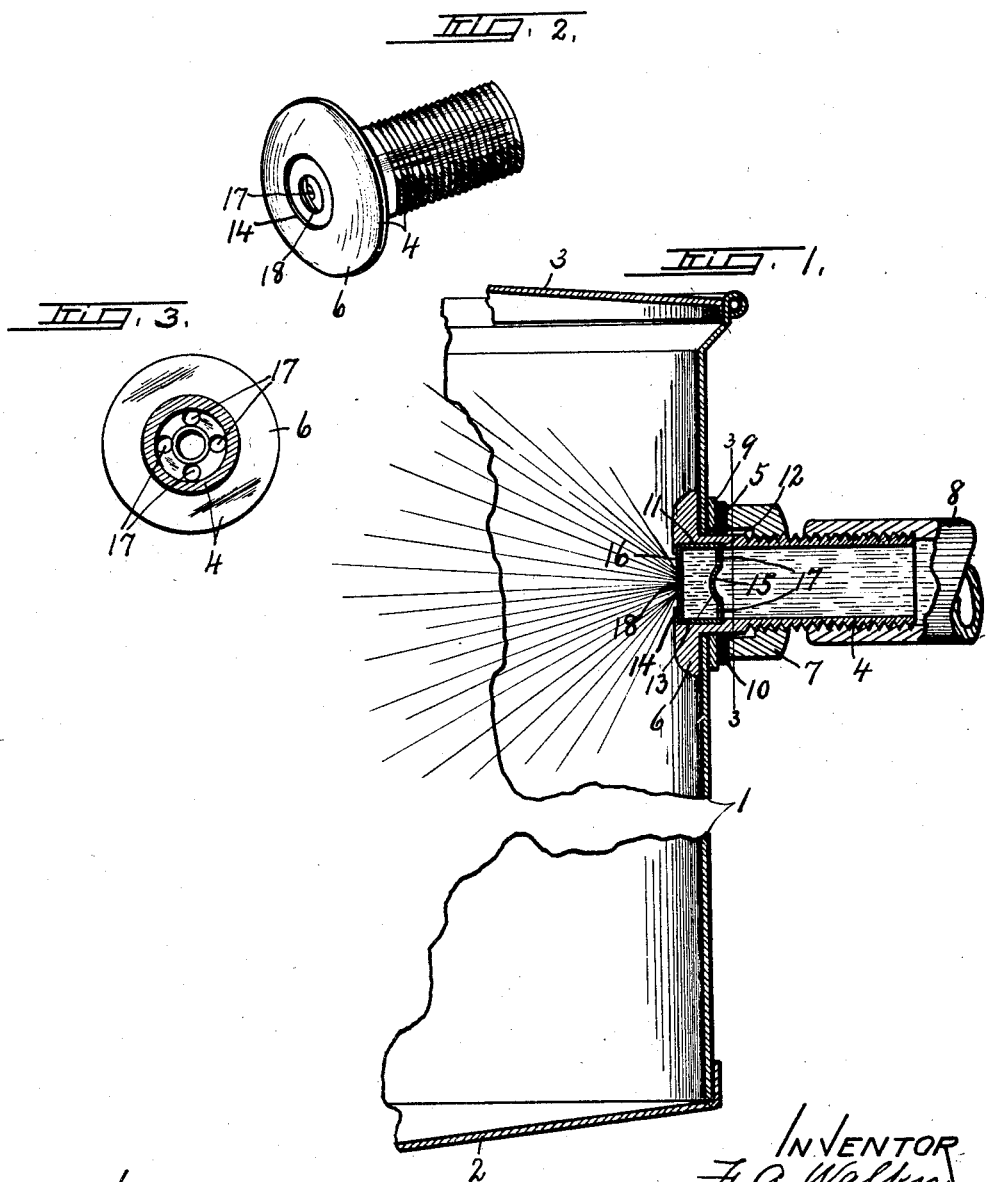
INVENTOR
F. A. Walker
BY Dempson & Thompson
ATTORNEYS
WITNESS
C. B. Churchill Patented Apr. 1, 1930

1,752,823

UNITED STATES PATENT OFFICE

FORREST A. WALKER, OF SYRACUSE, NEW YORK, ASSIGNOR TO WALKER DISH-WASHER CORPORATION, OF SYRACUSE, NEW YORK, A CORPORATION OF NEW YORK

SPRAY NOZZLE

Application filed May 18, 1927. Serial No. 192,294.

This invention relates to a spray nozzle adapted to be used more particularly in connection with the dish-containing vats of mechanical dishwashers for spraying fresh water upon the dishes which are usually supported in open-work trays at different levels within the vat but obviously may be used for a variety of other purposes where it is desired to project water under pressure over a relatively wide area and within a limited distance from the mouth of the nozzle.

The main object is to provide the nozzle with a simple attachment in the mouth thereof whereby the water under pressure will be projected with considerable force over a relatively wide substantially circular field close to and co-axial with the exit of the nozzle and thereby to effect the washing and rinsing of large quantities of dishes arranged in open-work trays at different levels within the vat by the use of a relatively small quantity of water.

Other objects and uses relating to specific parts of the nozzle will be brought out in the following description.

In the drawings:—

Figure 1 is a vertical sectional view, partly broken away, of one side of the vat of a mechanical dishwasher with my improved rinsing nozzle in operative position in one side of the vat.

Figure 2 is a perspective view of the detached nozzle,

Figure 3 is a transverse sectional view taken in the plane of line 3—3, Figure 1.

In order that the invention may be clearly understood I have shown a portion of a vat —1— of a mechanical dishwashing machine as provided with an inclined bottom —2— and a cover —3—.

The nozzle forming the subject matter of the present invention comprises a nipple or coupling member —4— inserted through an opening —5— in one side of the vat —1— some distance from the top but a greater distance from the bottom and having its inner end enlarged to form a head —6— adapted to engage the inner surface of the vat —1— around the opening —5— in such manner as to form a water-tight joint therewith, the adjacent faces of the head —6— and vat —1— being preferably soldered to each other to further prevent leakage of water at the joint.

The remaining portions of the tubular nipple —4— extend outwardly some distance beyond the outer face of the vat and preferably normal thereto and is threaded externally for receiving an internally threaded nut or gland —7— and a pipe —8— which latter may be connected to any available source of water supply under pressure.

Suitable washers —9— and —10— are interposed between the inner end of the nut —7— and outer face of the vat —1— for packing purposes, one of said washers as —10— being preferably made of more or less pliable packing material such as a rubber gasket or its equivalent while the inner washer may be made of metal.

When the nut —7— is tightened the washers —9— are pressed tightly against the outer face of the vat —1— while the head —6— is drawn tightly against the inner face of the vat to firmly hold the nipple in operative position and also to reduce the liability of leakage.

The inner end of the tubular nipple —4— is provided with a cylindrical recess —11— forming a shoulder —12— some distance from its inner end for receiving a hollow cylindrical insert —13— which is tightly fitted in the recess —11— with its outer end abutting against the shoulder —12—.

The axial length of the hollow insert —13— is somewhat less than the corresponding length of the recess —11— to permit the adjacent portion of the inner end of the head —6— to be crimped at —14— over and upon the marginal edge of the inner end of the hollow insert for firmly holding the latter in operative position against axial movement relatively to the nipple —4—.

For convenience of description this hollow insert may be termed the distributor and in addition to its circumferential cylindrical wall is provided with an outer end wall or partition —15— and an inner end wall —16—.

The central portion of the partition 15 is preferably concavo convex in cross section as shown in Figure 1 to form what may be termed a tapered boss which faces the outlet 18 coaxial therewith to serve the double purpose or reducing the liability of creating excessive vacuum in the chamber between the boss and outlet and also to reduce the liability of forming eddying current of the liquid within said space resulting from the passage of the liquid from the perforations 17 diagonally across said space and outwardly through the outlet 18.

The portions of the outer end wall or partition —15— of the distributor around the concavo-convex portion and within the interior of the tubular nipple —4— are provided with relatively small apertures —17— arranged in uniformly spaced relation circumferentially as shown in Figure 3.

The inner end wall of the distributor —13— is provided with a central opening —18— coaxial therewith and of less diameter than the circle passing through the inner walls of the openings —17— so that the water under pressure entering the openings —17— will be deflected at relatively sharp angles in transit from said openings through the central opening —18—.

From the foregoing description it will be seen that the nozzle is provided with axially spaced transverse partitions —15— and —16— across the interior of the tubular nipple —4— near the discharge end thereof and that the partitions —16— are provided with the relatively small central discharge opening —18— of less diameter than the interior diameter of the chamber between the partitions while the other partition as —15— is provided with a series of relatively small apertures as —17—arranged circumferentially around the axis of the tubular nipple —4— beyond the peripheral wall of the opening —18— in the first-named partition.

Under these conditions the water under pressure is forced through the apertures —17— and thence diagonally across and through the aperture —18— in the end in view of the fact that the apertures —17— are arranged in uniformly spaced relation circumferentially around the axis of the discharge opening —18— the water will be discharged through said opening —18— in the form of a conical spray or around a circular field of considerable area across the interior of the vat —1— thereby impinging against the dishes therein at widely varying angles to effect a thorough washing and cleansing of the dishes which may be supported more or less promiscuously by any suitable means within the vat.

When the washing and rinsing is completed the water supply to the nozzle may be shut off and the dishes allowed to remain in the vat to dry by drainage of the water therefrom.

The arrangement of the imperforate central portion —15— of the outer partition so as to face the outlet opening —18— in the inner partition seems to cause a contraction of the water in the chamber between the partitions toward the center of the discharge opening —18— due to the water pressure through the apertures —17— around the imperforate portion —15—.

In other words, as the water under pressure leaves the openings —17— it tends to follow the lines of least resistance through the discharge opening —18— and the convex side of the imperforate portion —15— acts as a deflector for deflecting the water from the openings —17— toward the center of the discharge opening —18— and this deflection assists in causing the water to emerge from the discharge opening —18— at various angles to the axis of the nozzle as indicated by the deflecting lines shown in Figure 1, the object of which is to spray as large an area of the dishes within the vat as possible.

What I claim is:—

1. A spray nozzle comprising a tubular nipple having its inlet end threaded externally and its outlet end provided with an out-turned flange, axially spaced partitions within the outlet end of the nipple, the partition nearest the outlet end being provided with a central restricted outlet opening and having its remaining portions imperforate, the other partitions having its central portion imperforate and convexed toward the first-named partition in axial alinement with the outlet opening, said other partition being provided with apertures arranged in uniformly spaced relation around the imperforate convexed portion.

2. A liquid spray nozzle comprising a tubular nipple having a restricted outlet in one end, and a transverse partition within the nipple in axially spaced relation to the outlet and provided with a central imperforate portion and perforations around the imperforate portion, said imperforate portion having a tapered boss projecting therefrom toward the outlet coaxial therewith to prevent the formation of excessive vacuum and eddying currents of the liquid in the space between the partition and outlet by the travel of the liquid from the perforations through the outlet.

In witness whereof I have hereunto set my hand this 2nd day of May, 1927.

FORREST A. WALKER.